UNITED STATES PATENT OFFICE.

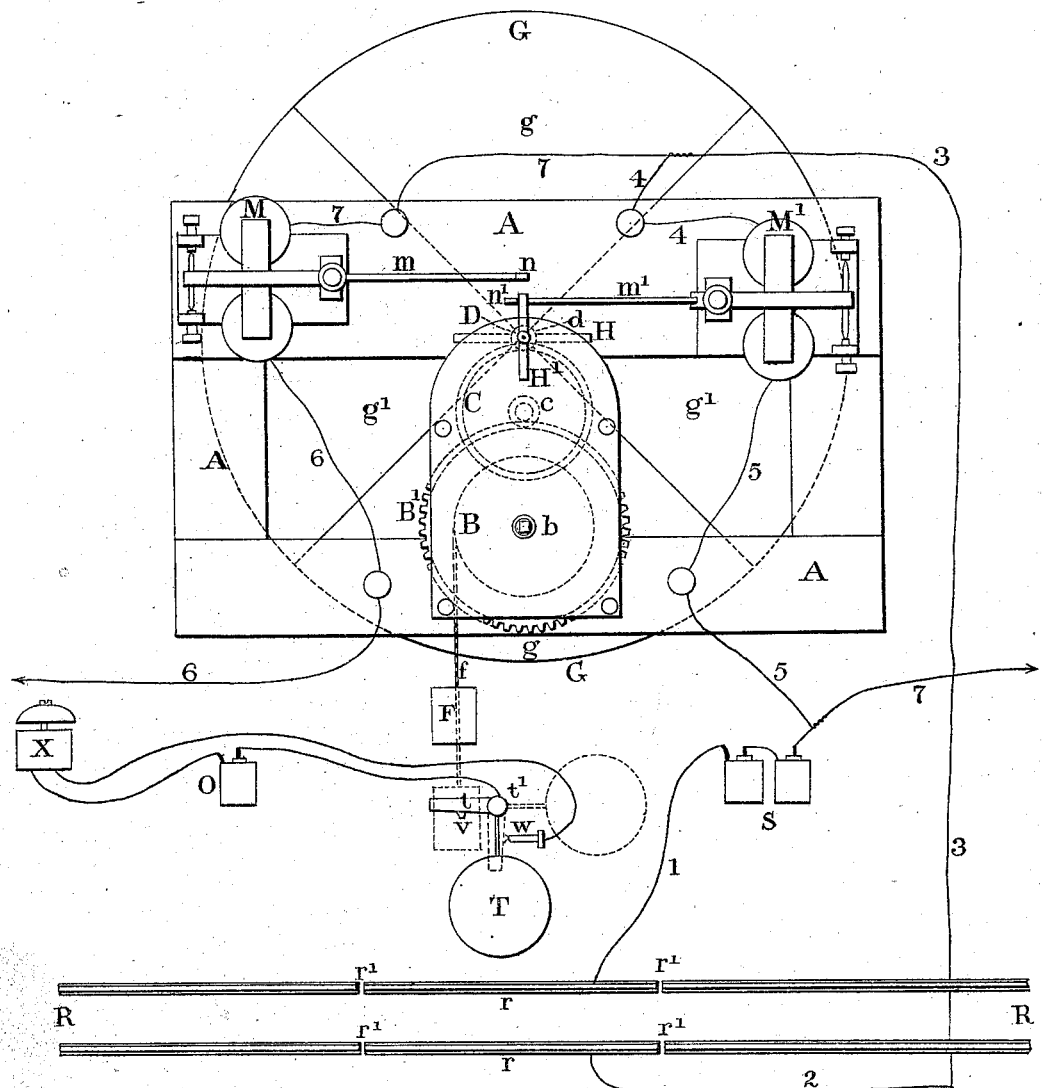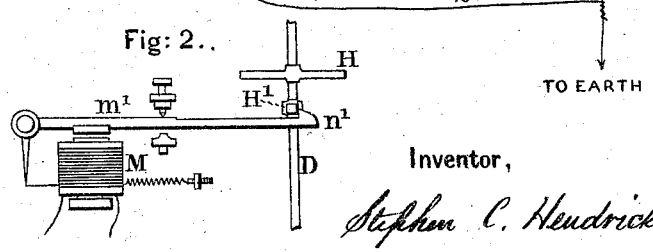

STEPHEN C. HENDRICKSON, OF BROOKLYN, E. D., NEW YORK.

IMPROVEMENT IN ELECTRIC RAILWAY-SIGNALS.

Specification forming part of Letters Patent No. 143,694, dated October 14, 1873; application filed December 26, 1872.

*To all whom it may concern:*

Be it known that I, STEPHEN C. HENDRICKSON, of Brooklyn, E. D., in the county of Kings and the State of New York, have invented certain Improvements in Automatic Electric Signals for Railroads, of which the following is a specification:

The first part of my invention relates to the combination of a signal or signal-disk, actuated by suitable mechanism, with two or more detents, operated alternately or successively by electro-magnetism, for the purpose of controlling the movements and indications of the said signal. The second part of my invention relates to the combination of an indicator or an alarm, or both, with the mechanism of a primary signal, for the purpose of notifying the attendant whenever the mechanism requires rewinding.

Figure 1 is a front elevation of the mechanism which actuates the signal. Fig. 2 is a detached view, showing one of the electro-magnets and its detent.

A is the frame upon which the different parts of the apparatus are fixed. B is a barrel, (shown in dotted lines,) which is fixed upon an arbor, $b$, and provided with a cord or chain, $f$, wound around it and attached to a weight, F. To the barrel B a toothed wheel, B', is fixed, by means of which the motion of the weight F is transmitted, through the pinion $c$, wheel C, and pinion $d$, to the arbor or shaft D, upon which is secured a suitable signal or signal-disk, G. The disk G is divided into four segments, $g\ g\ g'\ g'$, which are alternately composed of contrasting colors; thus, $g$ and $g$ may be white, and $g'\ g'$ red. Upon the arbor or shaft D are fixed two arms, H and H', at right angles to each other. A detent, $n'$, on the free end of the armature-lever $m'$ engages with the arm H' when the electro-magnet M' is not in action, and thus prevents the arbor D from revolving by the action of the weight F. A similar stop, $n$, on the armature-lever $m$ is so adjusted as to lie in the path of the arm H whenever the latter is caused to revolve and the electro-magnet M is not in action.

The apparatus shown in Fig. 1 is assumed to be one of a series of signals placed at suitable intervals along the line of a railroad.

The mechanism should be inclosed in a suitable case or box provided with openings, through which the signals may be displayed; or, if preferable, the mechanism only may be inclosed, and the signal-disk placed upon the exterior of the case.

The manner in which the apparatus is operated is as follows: R R represent the track of a railroad, a section of which, $r\ r$, in the vicinity of the signal, is insulated from the remainder by spaces $r'\ r'$ between the ends of the rails, or in any other suitable manner. A wire, 1, is attached to one pole of a voltaic battery, S, and to one of the insulated rails $r$. When the two rails $r\ r$ are bridged by the wheels and axles of a passing locomotive or train, an electrical current passes from the battery S, through the wires 1, 2, 3, and 4, to the electro-magnet M', and returns to the battery by the wire 5. The magnet M', being thus caused to attract its armature, depresses the detent $n'$ and releases the arm H'. The arbor D and the signal-disk G will turn, by the action of the weight F, through the distance of one-fourth of a revolution, or until the arm H comes in contact with the stop $n$ on the armature-lever $m$. The position of the signal-disk will now indicate "danger" or "caution." When the train reaches the next signal it closes the circuit of another battery, the current from which is conducted, through the wire 6, to the magnet M, which is thus caused to attract its armature, and withdraw the stop $n$ from the path of the arm H. The arm H is then free to revolve through the distance of another fourth of a complete revolution, or until the opposite end of the arm H' comes in contact with the detent $n'$, when the signal-disk G will again indicate "safety," as when in its original position. Thus it will be understood that the passage of a locomotive or train closes an electric circuit which acts upon the magnet M', and releases the mechanism, permitting the signal-disk to make one-fourth of a complete revolution. When the locomotive or train reaches the next signal in the direction in which it is moving, the other magnet, M, is in turn operated, and the signal is moved through another fourth of a complete revolution, thus alternately indicating "danger" or "caution" and "safety" by means of the alternating colors upon the signal-disk G. By this means the engineer of a train, upon reaching a signal, is informed whether or not the preceding train has passed beyond the next signal.

In order to notify the attendant when the mechanism requires rewinding, I provide an indicating apparatus, which is operated by the descending weight F. This signal may be of any suitable construction. I have shown a disk, T, attached to an arbor, $t'$, which is also provided with an arm, $t$. When the weight F has descended a certain distance it depresses the arm $t$ and elevates the disk T, as shown by the dotted lines in Fig. 1. When the arm $t$ is thus depressed, the stud $v$ makes electrical contact with the screw $w$, and closes the circuit of a battery, O, which is connected by wires with a suitable alarm-bell, X, at any required distance from the signal.

I do not desire to confine myself to the particular method described of closing circuit by a moving train; and I further remark that the disk G may be divided into six, eight, or any required number of segments, and the number of arms upon the shaft D increased to correspond therewith, so that several different colors or signals may be exhibited during each complete revolution of the signal-disk G.

A mechanical alarm-bell operated by a weight or spring, and released or set in action by the weight F or some other portion of the mechanism, may be employed in lieu of the electric alarm-bell X and its attachments.

I claim as my invention—

1. The combination of a signal or signal-disk, G, actuated by suitable mechanism, with two or more detents, $n$ $n'$, operated alternately or successively by electro-magnetism, substantially in the manner and for the purpose herein specified.

2. The combination of an indicator or alarm, either or both, with the actuating mechanism of a semaphoric signal, substantially as and for the purpose herein specified.

STEPHEN C. HENDRICKSON.

Witnesses:
JAMES N. ASHLEY,
FRANK L. POPE.